(12) United States Patent
Cabana et al.

(10) Patent No.: US 11,498,480 B2
(45) Date of Patent: Nov. 15, 2022

(54) ILLUMINATING DEVICE FOR VEHICLE CEILING LAMP

(71) Applicant: VALEO COMFORT AND DRIVING ASSISTANCE, Créteil (FR)

(72) Inventors: Thibault Cabana, Créteil (FR); Maryline Thorailler, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 17/414,654

(22) PCT Filed: Oct. 30, 2019

(86) PCT No.: PCT/EP2019/079614
§ 371 (c)(1),
(2) Date: Jun. 16, 2021

(87) PCT Pub. No.: WO2020/126178
PCT Pub. Date: Jun. 25, 2020

(65) Prior Publication Data
US 2022/0055533 A1 Feb. 24, 2022

(30) Foreign Application Priority Data
Dec. 19, 2018 (FR) ...................................... 1873306

(51) Int. Cl.
*B60Q 3/74* (2017.01)
*B60Q 3/64* (2017.01)
*B60Q 3/80* (2017.01)

(52) U.S. Cl.
CPC ................. *B60Q 3/74* (2017.02); *B60Q 3/64* (2017.02); *B60Q 3/80* (2017.02)

(58) Field of Classification Search
CPC ... B60Q 3/74; B60Q 3/64; B60Q 3/80; B60Q 3/44; B60Q 3/62; B60Q 3/82;
(Continued)

(56) References Cited

U.S. PATENT DOCUMENTS 7,599,136 B2 * 10/2009 Kracker ................... B60Q 3/76
359/811
7,775,693 B2 * 8/2010 Kracker ................... B60Q 3/76
362/490
(Continued)

FOREIGN PATENT DOCUMENTS

DE 102013208088 A1 11/2014
DE 102013013106 A1 2/2015
(Continued)

OTHER PUBLICATIONS

International Search Report and Written Opinion corresponding to International Application No. PCT/EP2019/079614, dated Jan. 7, 2020 (12 pages).

*Primary Examiner* — Peggy A Neils
(74) *Attorney, Agent, or Firm* — Osha Bergman Watanabe & Burton LLP

(57) ABSTRACT

The invention relates to a device for generating light, in particular for a vehicle passenger compartment ceiling lamp (100), comprising: a separating tube (7) made of a material that is opaque to the radiation used, which is intended to be placed in an aperture (101) forming an exit for the illuminating light, is tubular along an axis orthogonal to the aperture and is of "c"-shaped radial cross section, forming an axial window (71), a bounding light guide (53) encircling the separating tube (7) having an annular exit dioptric interface (55), a base (57) in the axial extension of the exit dioptric interface, axial extensions (59), extending axially at least in segments the base (57), comprising entrance dioptric interfaces (61), which are placed facing bounding light sources (51), an illuminating light guide (33), which is located axially facing the illuminating light source (31) of the separating tube and axially removed from the aperture (101) comprising an entrance dioptric interface (35), which is placed facing an illuminating light source (31), a total (Continued)

reflection surface (39), from which light entering via the entrance dioptric interface (35) is reflected at a predefined angle of inclination with respect to the normal to the entrance dioptric interface (35), and an exit dioptric interface (37), via which the light reflected from the total reflection surface (39) is emitted in the direction of the aperture (101).

14 Claims, 7 Drawing Sheets

(58) Field of Classification Search
CPC .............. B60K 35/00; B60K 2370/336; B60K 2370/34; B60K 2370/345; F21S 43/237; F21S 43/243; F21S 43/26; F21S 43/315; F21S 43/40
See application file for complete search history.

(56) References Cited

U.S. PATENT DOCUMENTS

| | | |
|---|---|---|
| 10,106,078 B1 * | 10/2018 | Chen .................. F21V 19/0015 |
| 2015/0362658 A1 | 12/2015 | Lee |
| 2017/0001555 A1 | 1/2017 | Udo et al. |
| 2020/0062177 A1 * | 2/2020 | Ishibashi ............. F21V 23/0485 |

FOREIGN PATENT DOCUMENTS

| | | |
|---|---|---|
| DE | 102014212508 A1 | 12/2015 |
| DE | 102016200580 A1 | 7/2017 |
| EP | 3381748 A1 | 10/2018 |
| WO | 90/04132 A1 | 4/1990 |

* cited by examiner

ILLUMINATING DEVICE FOR VEHICLE CEILING LAMP

FIELD OF INVENTION

The present invention relates to an illuminating device, in particular for a vehicle passenger-compartment ceiling light.

BACKGROUND

Vehicle passenger compartments are generally provided with an overhead illuminating device, also known as a ceiling light, that provides the driver or a passenger with additional lighting allowing, for example, a map to be consulted or a text to be read.

These devices generally comprise one or more light sources, which are located in the vehicle ceiling light, and the driver or passenger actuates a switch to turn the light source on or off. The light beam generated by the source is formed (so as to concentrate it and increase its uniformity) then directed toward an expected position of the driver or passenger—generally the seats they are supposed to occupy.

In the context of esthetic choices made to give the passenger compartments of vehicles an uncluttered appearance, it is known practice to place the light sources behind a window, most of the area of which is covered with an opaque layer, and which is covered with a touch surface, actuation of which by contact with the finger or hand of a user turns on or off the lighting, the beam of which passes through the window via an aperture in the opaque layer.

To delineate the segment of the touch surface, the actuation of which triggers the lighting to turn on, a backlit outline, encircling the aperture through which the illuminating beam passes, may be used. Backlighting has the advantage of making the segment of the touch surface forming the actuator visible in the dark or the half-light of a vehicle passenger compartment at night.

To obtain this backlit outline, a bounding light source is placed in the ceiling light, with an associated light guide.

The presence of two sets of diodes forming the illuminating and bounding light sources, with associated guides or lenses, and the potential presence of other elements, such as ceiling speakers (in the context of a multimedia device), on a printed circuit board bearing the diodes requires there to be a gap between said printed circuit board and the visible surface, with which the user interacts.

This gap, associated with the presence of two nested, bounding and illuminating, light sources, makes routing the light beams complex, especially given that the light beams must be inclined and oriented toward the driver and the passenger from a central ceiling light.

SUMMARY

In order to at least partially resolve the aforementioned problem, one subject of the invention is a light-generating device, in particular for a vehicle passenger-compartment ceiling lamp, characterized in that it comprises:
- a separating tube made of a material that is opaque to the radiation used and intended to be placed in an aperture forming an exit for illuminating light, and which is tubular along an axis orthogonal to the aperture and has a radial cross section that is "c" shaped, so as to form an axial window,
- a bounding light guide, encircling the separating tube having:
  an annular exit dioptric interface,
  a base in the axial extension of the exit dioptric interface,
  axial extensions, which extend the base axially at least in part, comprising, at their end opposite the base, entrance dioptric interfaces, which are placed facing bounding light sources,
- a guide of illuminating light, which is located axially facing the illuminating light source of the separating tube and axially offset from the aperture, comprising:
  an entrance dioptric interface, placed facing an illuminating light source,
  a total-reflection surface, from which light entering through the entrance dioptric interface is reflected at a preset angle of inclination to the normal to the entrance dioptric interface,
  an exit dioptric interface, through which the light reflected from the total-reflection surface is emitted in the direction of the aperture.

The guide of illuminating light allows an inclined beam, which is transmitted to the aperture via the axial window, to be obtained. The light guides used allow the printed circuit board bearing the light sources to be set back from the façade of the ceiling light.

Said device may further have one or more of the following features, which may be implemented alone or in combination.

The bounding light guide may comprise, for each bounding light source, at least one axial pillar, which is integrally formed with and made of the same material as the base, forming light guides for the light emitted by the bounding light sources in the direction of the base, and having:
  tangential walls parallel to those of the base and radial walls that flare in the direction of the base,
  an upper wall forming an entrance dioptric interface located facing one of the bounding light sources.

The annular base may comprise a segment of material that scatters the light in order to increase the uniformity of the light intensity over the annular area of the exit dioptric interface.

The entrance dioptric interface of the guide of illuminating light may take the form of a Fresnel lens, the illuminating light source being located at the focal point thereof.

The exit dioptric interface of the guide of illuminating light may comprise a lens, the aperture being located at the focal point thereof.

The guide of illuminating light may take the form of a diagonally truncated cylinder, the diagonal truncation surface forming the total-reflection surface.

The guide of illuminating light may be produced in the form of an elbow, comprising two cylindrical segments, one of which carries the entrance dioptric interface, and the other the exit dioptric interface, the elbow between the two cylindrical segments bearing the total-reflection surface.

Another subject of the invention is a vehicle ceiling light, characterized in that it comprises at least one device such as mentioned above, and in that the illuminating beam is oriented toward a location of an occupant of the vehicle.

Said ceiling light may further comprises a façade, most of the area of which is opaque and which comprises a transparent circular window located facing an end of the separating tube that is opposite to the light sources, forming the aperture.

Said ceiling light may further comprise an annular window facing the exit dioptric interface of the annular base of the bounding light guide.

The façade may comprise an opaque layer or coating over most of its area, and the circular and annular windows may have a transparency comprised between 10 and 50%.

The façade may comprise at least one touch surface, which, when contact with a part of the body of a user is detected, turns on or off the illuminating light source.

Said touch surface may be placed level with the aperture.

The ceiling light may in particular comprise two devices such as mentioned above, one emitting an illuminating beam in the direction of the driver of the vehicle, the other emitting an illuminating beam in the direction of a front passenger of the vehicle.

BRIEF DESCRIPTION OF THE DRAWINGS

Other features and advantages of the invention will become more clearly apparent upon reading the following description, which is given by way of illustrative and non-limiting example, and the appended drawings, in which.

DETAILED DESCRIPTION

The embodiments described with reference to the figures are examples. Although the description refers to one or more embodiments, this does not necessarily mean that each reference relates to the same embodiment, or that the features apply only to one embodiment. Individual features of various embodiments may also be combined to create other embodiments.

Terms such as "first" and "second" used below are given simply by way of reference and do not indicate any particular preference or order of assembly.

A number of positional qualifiers such as "above" or "under", "below", "to the left" etc. are also used with reference to the figures. These qualifiers are only used to help with comprehension of the described figures and the embodiment that they show. In particular, a given embodiment of the device may immaterially be mounted on surfaces oriented in various ways.

Figure 1:
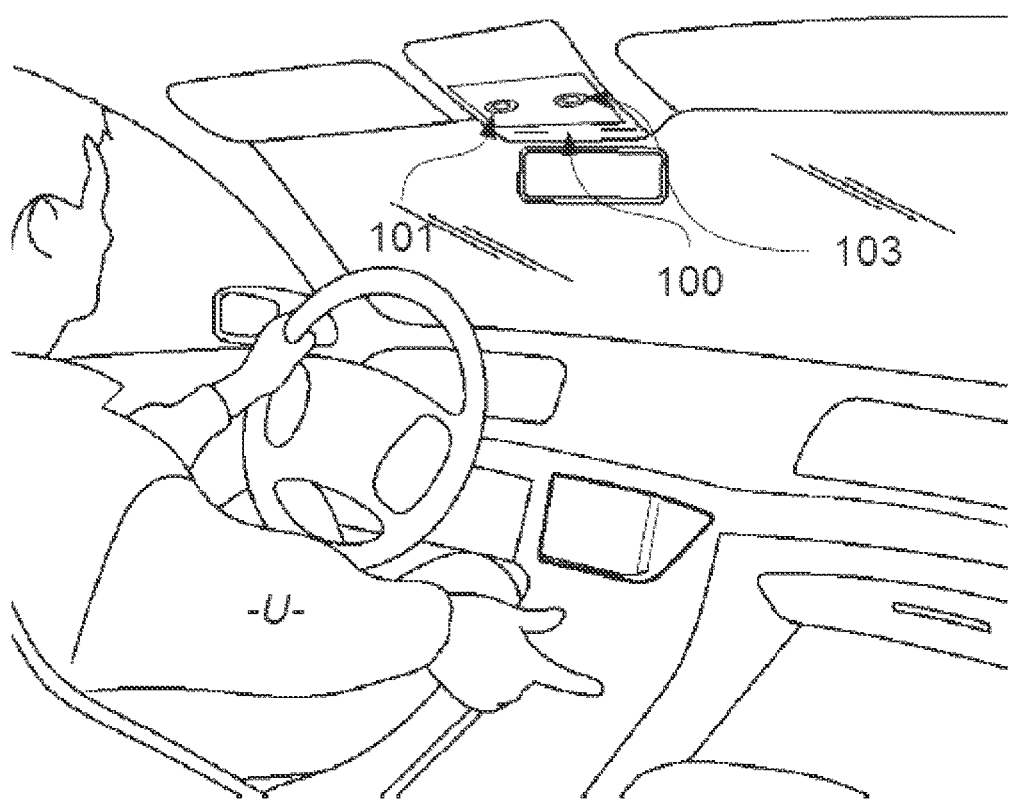
FIG. 1 schematically shows a vehicle passenger compartment, with a ceiling light comprising two illuminating devices.

FIG. 1 schematically shows a motor-vehicle passenger compartment comprising a ceiling light 100 in which an illuminating device is placed. In particular, two exits 101, 103 of light, via which a light beam is transmitted in the direction of a user U, the driver or passenger of the vehicle respectively, are shown.

Figure 2:
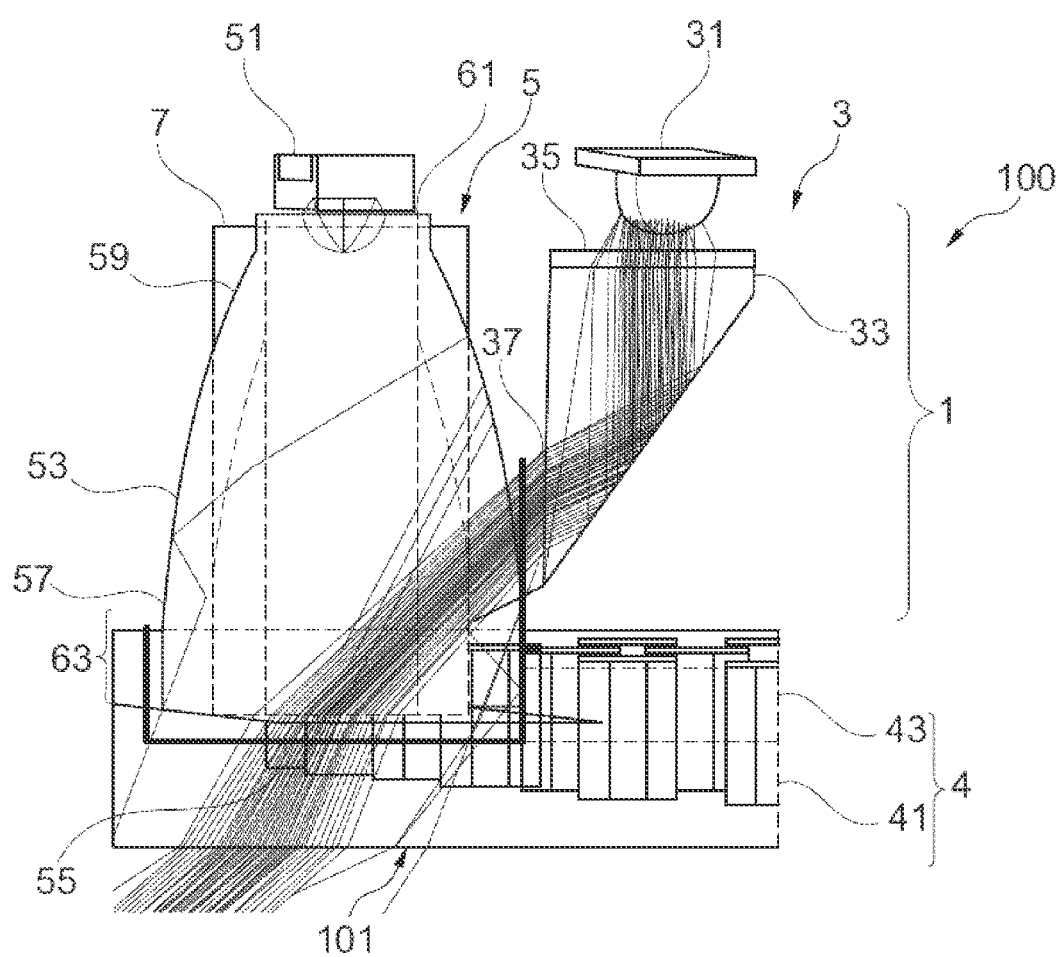
FIG. 2 shows an illuminating device outside the ceiling light.

The ceiling light 100 is partially shown in cross section in FIG. 2. In particular, in FIG. 2, a single aperture 101 is shown with a single light-generating device.

The light-generating device 1 in particular comprises an illuminating light-generating module 3, and a bounding light-generating module 5. The illuminating light-generating module 3 produces a beam for illuminating the passenger compartment, for example in order to allow a map to be read, and that is therefore relatively powerful. The bounding light-generating module 5 provides illumination that serves to locate and/or delineate the segment of area bearing a touch surface level with the apertures 101, 103, for example in order to allow a user U to turn on the illuminating light-generating module 3 in a dark passenger compartment (night, tunnel, underground parking lot, etc.).

The illuminating light-generating module 3 in particular comprises an illuminating light source 31, for example a high-power diode, in particular a white diode typically of more than 100 lumens, and a guide 33 of illuminating light. The illuminating light-generating device 3 is in particular offset in a radial direction, parallel to the plane of the aperture 101, relative to said aperture.

The guide 33 of illuminating light is shown in more detail in FIG. 3 and discussed below with reference to this figure.

The bounding light-generating module 5 comprises a bounding light source 51, which may in particular be attached to the same flat printed circuit board as the illuminating light source 31. The bounding light source 51 may for example be an optionally colored, light-emitting diode of lower power (30-50 lumens).

The bounding light-generating device 5 also comprises a bounding light guide 53 that encircles a separating tube 7. The bounding light guide 53 comprises an exit dioptric interface 55 that here is annular.

The separating tube 7 is tubular, is made of a material that is opaque to visible radiation, has an axis of revolution parallel to that of the bounding light guide 53, and has a radial cross section that is "c" shaped, so as to form an axial window 71 (see FIGS. 5 and 6) that is oriented in the direction of the illuminating module 3. The beam generated by said illuminating module 3 passes through said axial window 71 and then passes through the aperture 101.

The separating tube 7 may either be a separate part, integrated into the assembly, or indeed be a part that is integrally formed with and made of the same material as, for example, the façade 4, or a fixed holder for example bearing the printed circuit board on which the light sources 31, 51 are placed. In the case of a separating tube 7 that is integrally formed with and made of the same material as, for example, the façade 4, the shield takes the form of a ridge or protuberance of the façade 4.

The bounding light guide 53 is made of a transparent material of relatively high index, such as polymethyl methacrylate PMMA (index higher than 1.2), in order to promote total reflection from the axial walls of said guide 53. PMMA furthermore has the advantage of being light and easy to mold, by injection molding for example.

Said light guide 53 comprises a base 57 in the axial extension of the exit dioptric interface 55, and which here is therefore substantially tubular. From the annular base 57 extend axial extensions 59, which extend the base 57 axially at least in part, comprising, at their end opposite the base, entrance dioptric interfaces 61 of the bounding light guide 53. Said light guide 53 here in particular comprises two axial extensions 59 each with one entrance dioptric interface 61.

The axial extensions 59 are for example axial pillars that are integrally formed with and made of the same material as the base 57, and that are flared in the direction of said base 57 in order to better guide of the light beam, and in particular to distribute the light over the entire exit dioptric interface 55. The axial extensions therefore comprise tangential walls that are parallel to those of the annular base, radial walls that flare in the direction of the annular base, and an upper wall forming the entrance dioptric interface 61.

The entrance dioptric interfaces 61, in the assembled state of the ceiling light 100, face the bounding light sources 51. The axial extensions 59 and the bounding light sources 51 are regularly distributed around the annular perimeter of the tubular bounding light guide 51.

A lower segment 63 of the base of the bounding light guide 51, level with the exit dioptric interface 55, is made of a scattering material, for example achieved by adding glass particles or indeed by sintering PMMA particles, so as to distribute the light generated by the bounding light sources 51.

The ceiling light 100 further comprises a façade 4, most of the frontal area of which, i.e. of the area that is visible to the occupants of the vehicle, is opaque. The façade 4 bears the transparent circular apertures 101, 103, which are each located facing one end of the central tube 7 on the side opposite the light sources 31, 51, and facing the exit dioptric interface 55 of the bounding light guide 53. The apertures 101, 103 in particular have a transparency comprised between 10 and 40%, via which the light emitted by the sources 31, 51 and guided by the guides 33, 53 is conveyed to the segments of the passenger compartment to be illuminated.

In one particular configuration, the apertures 101, 103 each comprise a circular window, located facing the exit dioptric interface 37 of the guide 33 of illuminating light, and an annular window encircling the circular aperture, the dimensions of which correspond to those of the exit dioptric interface 57 of the bounding light guide 53, and which is located facing said exit dioptric interface 57.

The illuminating light and the bounding light of a given aperture are thus each delivered via a different window of the aperture 101, 103.

In particular, the façade 4 comprises a plate 41 of transparent material, and an opaque layer or coating 43 most of the area of which is colored, the exception being the segments corresponding to the apertures 101, 103.

In the embodiment of FIG. 2, the plate 43 of colored material is relatively thick (a few millimeters to 1 cm for example). The fact that the apertures 101, 103 are formed by removing said plate 43 of opaque material leads to the presence of trenches, or of a housing in which a segment of the light guides 33, 53 may be inserted for the purposes of positioning and holding in place during assembly.

For example, a segment of the bounding light guide 51, here the annular base 63, is inserted into the housing thus formed.

The frontal area of the transparent layer 41 is in particular covered with a transparent touch surface, which, when contact with a part of the body of a user U (finger, hand) is detected, turns on or off the illuminating light source 31. Contact with the touch surface may also be used to turn off or on the bounding light source 53 when the illuminating light source 31 is turned on or off, respectively.

The touch surface, or at least one segment of its active area, is advantageously limited to the area delineated by the apertures and optionally their immediate vicinity. The light of the bounding light-generating module 5 then serves to indicate and delineate, to the occupants, the segment of frontal area against which to press a finger or a hand to turn on and/or off the illuminating light source 31.

The one or more apertures 101, 103 (FIG. 1) may respectively comprise an additional lens, optionally a Fresnel lens, for forming the illuminating light beam. This additional lens is advantageously placed on the internal face (toward the light sources 31, 51) of the apertures 101, 103, with a view to giving the visible surface a uniform appearance. Placing said additional lenses on the external surface may however make the apertures 101, 103 easier to find by touch, by forming a relief.

Figure 3:
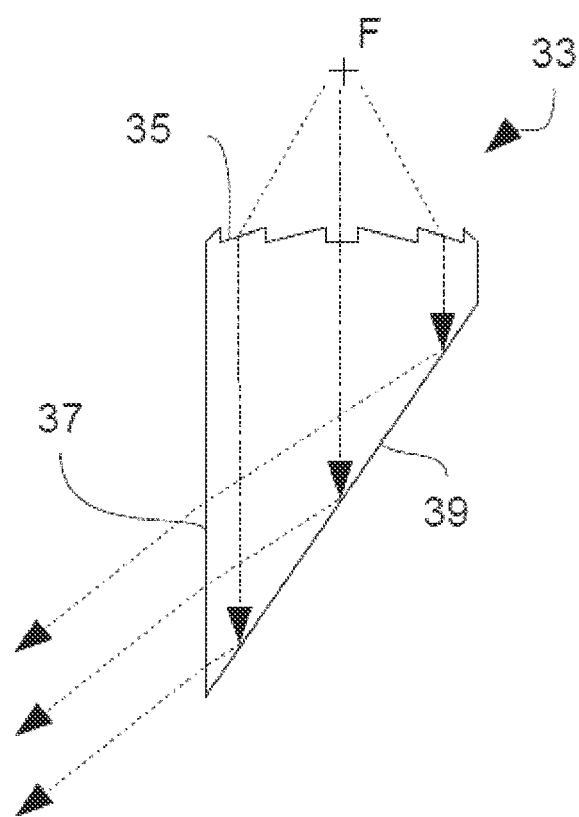
FIG. 3 is a cross-sectional view of a guide of illuminating light for the device of FIG. 2.

FIG. 3 is a cross-sectional view of a guide 33 of illuminating light alone. The guide 33 of illuminating light is also made of a transparent material of relatively high index, such as polymethyl methacrylate PMMA (index higher than 1.2), in order to cause total reflection from walls other than the entrance and exit dioptric interfaces 35, 37.

The shape of the body of the guide 33 of illuminating light is that of a tube that is truncated by a plane that is inclined with respect to the axis of the tube on the side opposite the illuminating light source 31. The resulting surface of the truncation forms a total-reflection surface 39 that is flat and roughly oval.

The entrance dioptric interface 35 of the guide of illuminating light is intended to be placed facing the illuminating light source 31.

In the embodiment of FIG. 3, the entrance dioptric interface 35 takes the form of a converging lens, and in particular of a Fresnel lens for greater compactness. In the assembled state of the ceiling light 100, the illuminating light source 31 is preferably located at the focal point F of the lens. In this way, the light beam is collimated by the lens formed by the entrance dioptric interface 35.

The paths of three light rays have been shown in FIG. 3 by dotted arrows. The rays generated by the diode at the focal point of the lens formed by the entrance dioptric interface 35 enter into the guide 33 of illuminating light via said dioptric interface 35. The rays are then collimated by said lens, and therefore propagate substantially parallel to each other and to the axis of the tube of the guide 33 of illuminating light.

The rays are then reflected from the total-reflection surface 39, they meet the exit dioptric interface 37 with a large angle, and then exit through the curved axial surface of the light guide 33 forming said exit dioptric interface 37, with an average direction that is inclined with respect to the axis of the cylindrical body of said guide 33 of illuminating light.

According to one embodiment (not shown), the guide 33 of illuminating light may comprise an exit dioptric interface 37 that takes the form of a lens, a spherical lens for example, the focal point of which is close to the center of the aperture 101 through which the light beam is introduced into the passenger compartment.

According to another embodiment, the ceiling light comprises a circular aperture 101 of small size, and an additional annular aperture the location and dimensions of which correspond to those of the exit dioptric interface 57 of the bounding light guide 53.

The apertures in particular have a transparency comprised between 10 and 90% in the visible spectral range. The transparent plate 41 may however be tinted in its bulk with dark or black colorants, so as to decrease transparency to 10 to 50%. These transparency values, with a dark tint, allow the apertures to be made imperceptible in the absence of backlighting.

Figure 4:
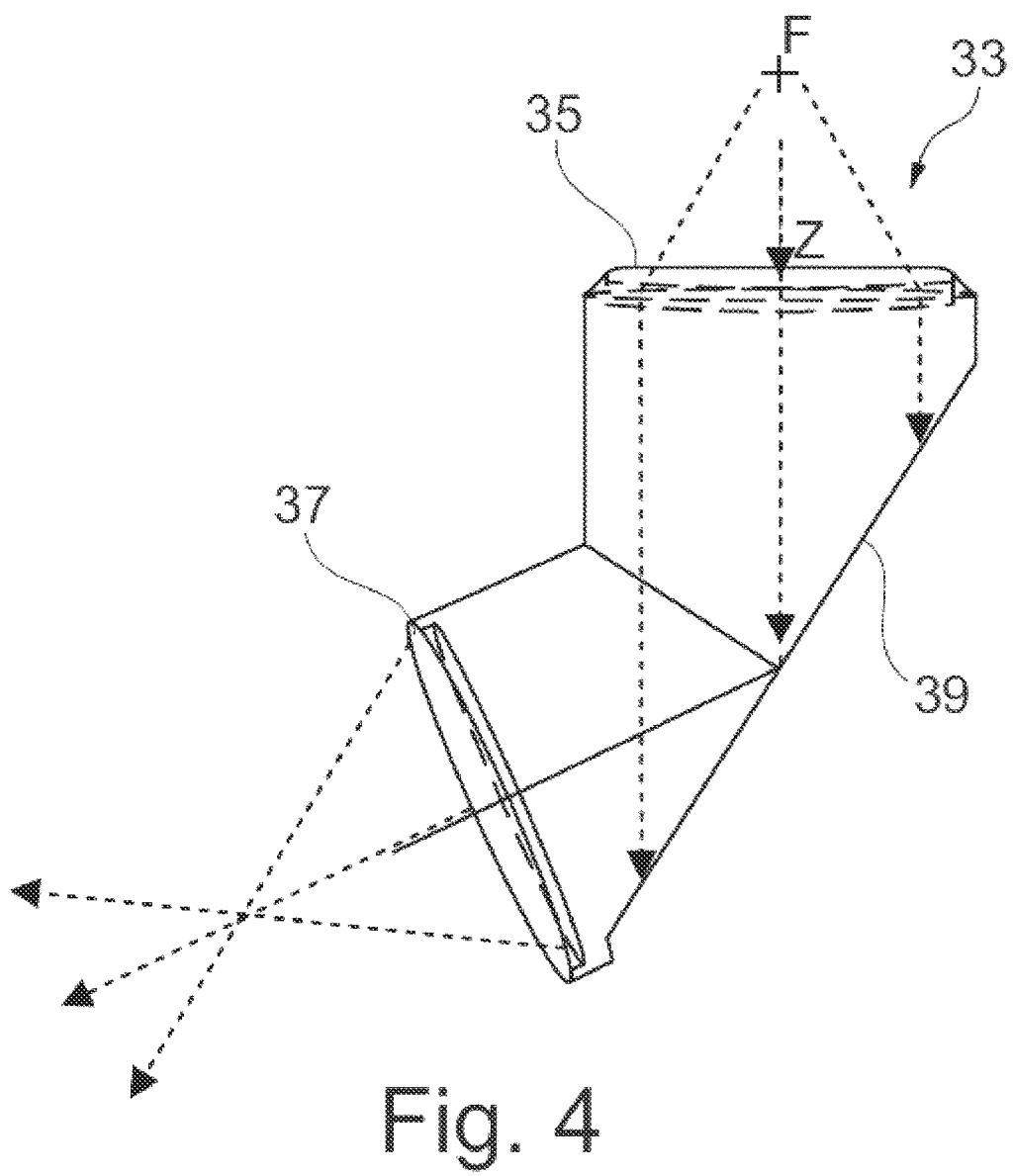
FIG. 4 is a side view of an alternative embodiment of the light guide of FIG. 3.

FIG. 4 is a perspective representation of an alternative embodiment of guide 33 of illuminating light.

In this embodiment, the guide 33 of illuminating light takes the form of an elbow. It comprises two cylindrical segments, one of which bears the entrance dioptric interface 33, which here takes the form of a Fresnel lens, and the other of which bears the exit dioptric interface, which here also takes the form of a Fresnel lens. The total-reflection surface 39 is located at the elbow between the two cylindrical segments.

The rays generated by the illuminating light source 31 then follow a path similar to that in FIG. 3, up to the exit dioptric interface 37. In particular, the light beam collimated and reflected in said light guide 33 is focused by the exit dioptric interface 37. The light beam may then be guided through a narrower aperture, but the beam obtained will be more substantially divergent. Such a beam would for example be suitable in the case of ambient lighting, which is in particular activated when a door is opened.

Figure 5:
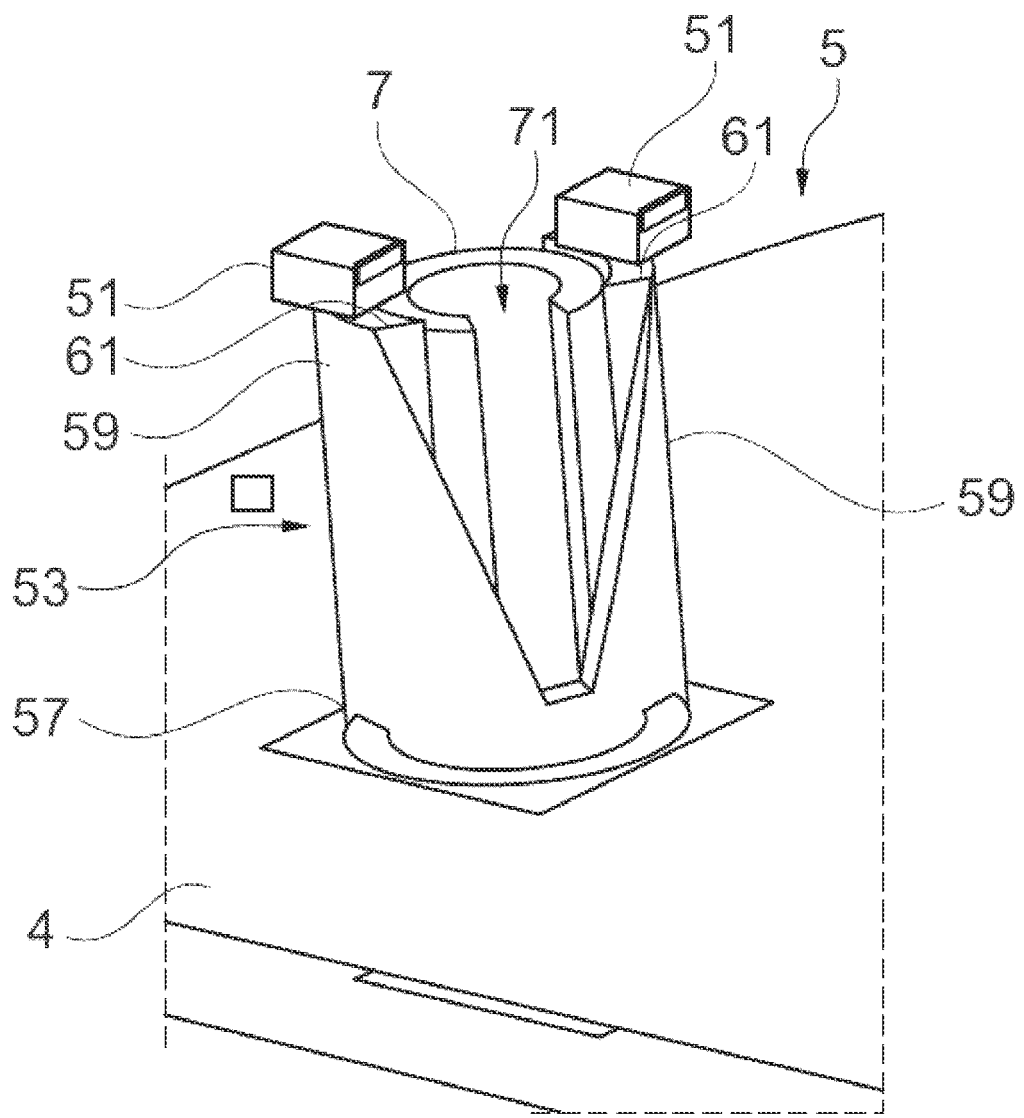
FIG. 5 is a perspective view of a bounding illuminating module for the device of FIG. 2.

The bounding light-generating module 5 and the separating tube 7 are shown in perspective in FIG. 5, placed on a façade segment 4.

The axial window 71 and the aperture formed between two axial extensions 59 are superposed so as to allow light to pass therethrough.

Figure 6:
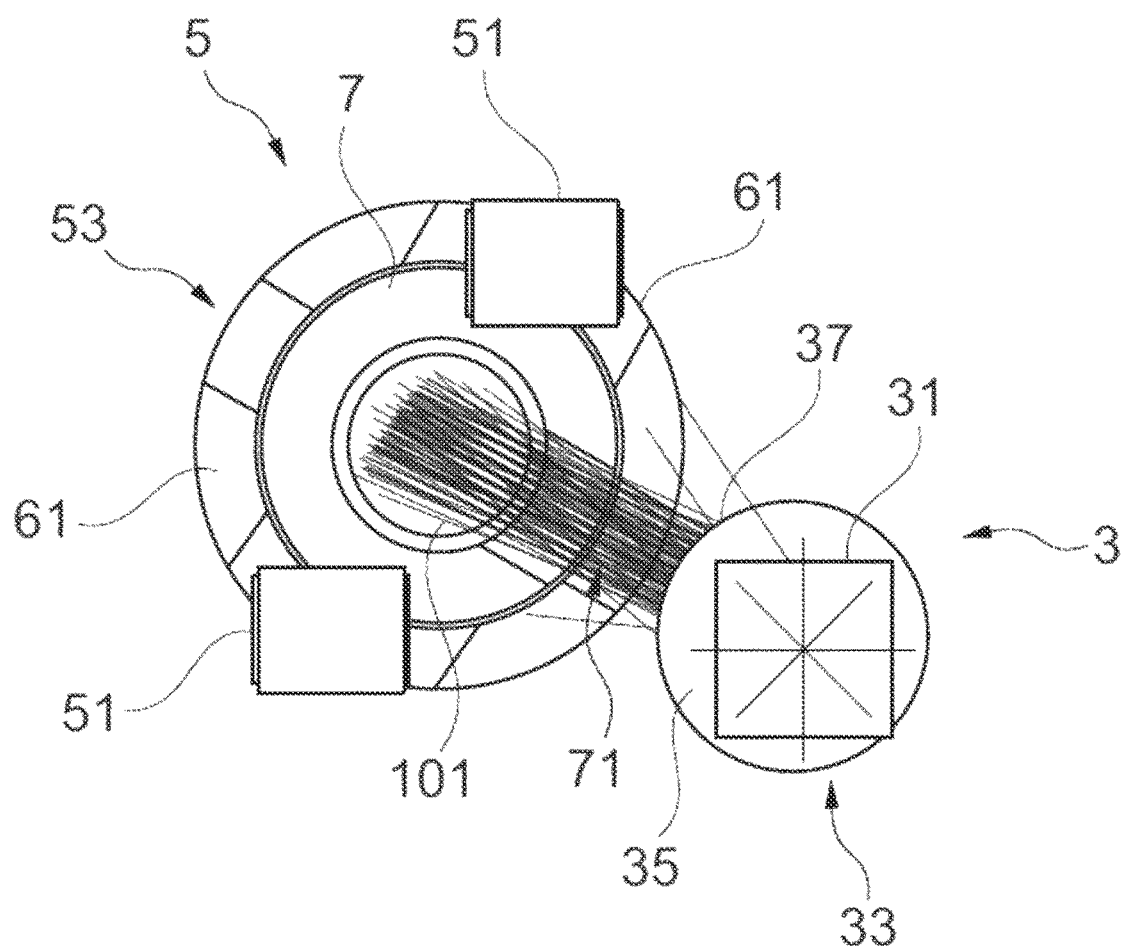
FIG. 6 is a view from above of the device of FIG. 2.

In FIG. 6, the alignment of the aperture between two axial extensions 59, the axial window 71 and the exit dioptric interface 37 of the bounding light guide 33 of the light-generating device 1 is shown via a view from above.

Light rays output from the exit dioptric interface 37 of the bounding light guide 33 are shown in FIG. 6. Said light rays exit from said dioptric interface 37 mainly in the direction of the aperture and of the axial window 71, through which they pass before reaching the aperture 101 of the façade 4.

The separating tube 7 makes it possible to prevent light rays generated by the illuminating light-generating module 3 from entering into the bounding light guide 53, and light rays generated by the bounding light-generating module 5 from entering into the guide 33 of illuminating light. The lighting effects employed to light and bound the actuation region are thus separated, to improve the perceived quality of the ceiling light 100: when the illuminating light-generating module 3 is off, the only light visible is that of the bounding light-generating module 5 and vice versa.

Figure 7:
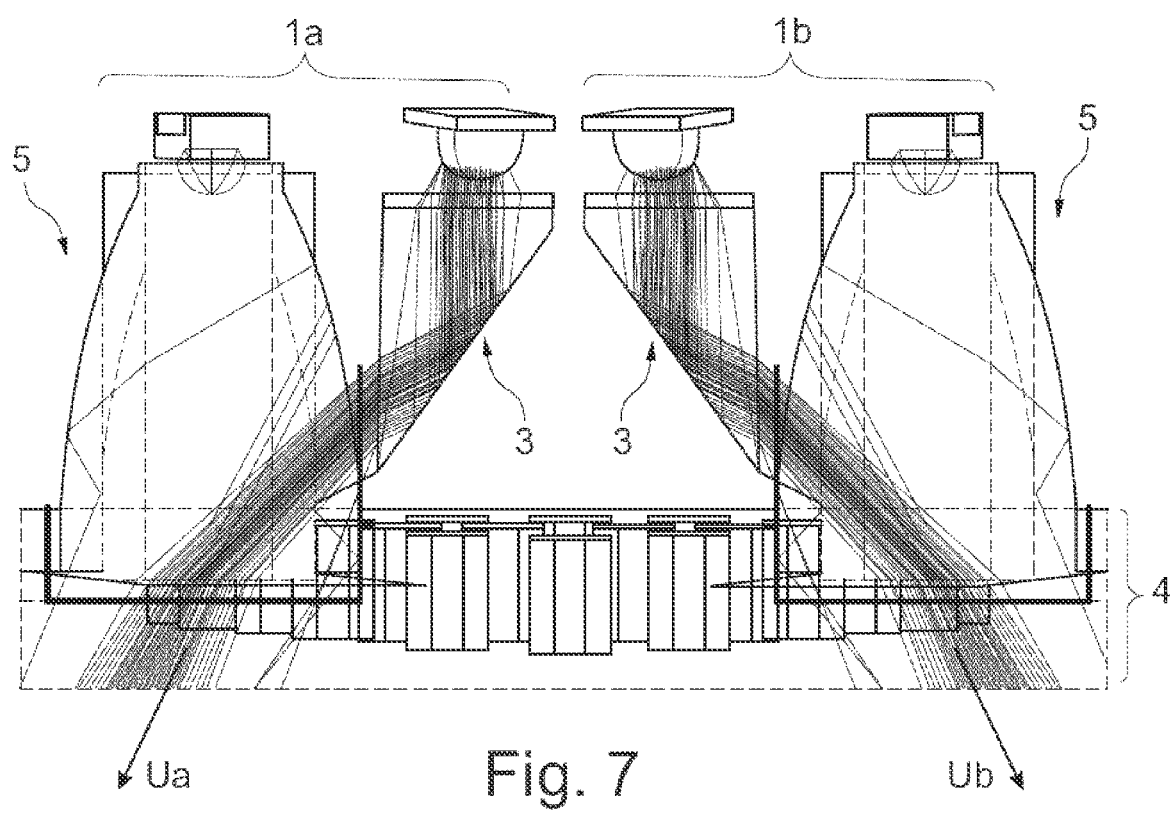
FIG. 7 is a perspective representation of one embodiment of a ceiling light combining two devices according to FIG. 2.

FIG. 7 is a schematic representation of a ceiling light 100 comprising two light-generating devices 1a and 1b.

Each of the light-generating devices 1a, 1b is placed in a symmetrical position with respect to the other, each level with one of the two apertures 101, 103.

The light beam generated by the illuminating light-generating module 3 of the first device 1a is directed toward an expected position of a first user Ua, the driver of the vehicle for example. The expected position of said first user Ua is then the driver's seat of the vehicle.

The light beam generated by the illuminating light-generating module 3 of the second device 1b is directed toward an expected position of a second user Ub, the front passenger of the vehicle for example. The expected position of said second user Ub is then the front passenger seat of the vehicle.

The ceiling light 100 thus obtained may easily be placed level with the rear-view mirror of a conventional vehicle. The illuminating beams are then directed toward the occupants (front passenger and driver) so as to allow them to read a map, find an object, inter alia. The light from the bounding light-generating module 3 allows the regions in which a pressure will trigger the emission of an illuminating light beam to be made visible, in particular in a dark environment, for example at night or in a tunnel or garage.

The invention claimed is:

1. A light-generating device for a ceiling light of a vehicle passenger compartment, comprising:
a separating tube made of a material that is opaque to the radiation used and configured to be placed in an aperture forming an exit for illuminating light, and which is tubular along an axis orthogonal to the aperture and has a radial cross section that is "c" shaped, so as to form an axial window;
a bounding light guide, encircling the separating tube having:
an annular exit dioptric interface, and
a base in the axial extension of the exit dioptric interface,
axial extensions, which extend the base axially at least in part, comprising, at an end opposite the base, entrance dioptric interfaces, which are placed facing bounding light sources,
a guide of illuminating light, which is located axially facing an illuminating light source and axially offset from the aperture, comprising:
an entrance dioptric interface, placed facing the illuminating light source,
a total-reflection surface, from which light entering through the entrance dioptric interface is reflected at a preset angle of inclination to the normal to the entrance dioptric interface,
an exit dioptric interface, through which the light reflected from the total-reflection surface is emitted in the direction of the aperture.

2. The device as claimed in claim 1, wherein the bounding light guide comprises, for each bounding light source, at least one axial pillar, which is integrally formed with and made of the same material as the base, forming light guides for the light emitted by the bounding light sources in the direction of the base, and having:
tangential walls parallel to those of the base and radial walls that flare in the direction of the base,
an upper wall forming the entrance dioptric interface and located facing one of the bounding light sources.

3. The device as claimed in claim 1, wherein the base comprising a segment of material that scatters the light in order to increase the uniformity of the light intensity over the annular area of the exit dioptric interface.

4. The device as claimed in claim 1, wherein the entrance dioptric interface of the guide of illuminating light takes the form of a Fresnel lens, the illuminating light source being located at the focal point thereof.

5. The device as claimed in claim 1, wherein the exit dioptric interface comprises a lens, the aperture being located at the focal point thereof.

6. The device as claimed in claim 1, wherein the guide of illuminating light takes the form of a diagonally truncated cylinder having a diagonal truncation surface, the diagonal truncation surface forming the total-reflection surface.

7. The device as claimed in claim 1, wherein the guide of illuminating light takes the form of an elbow, comprising two cylindrical segments, one of which bears the entrance dioptric interface, and the other the exit dioptric interface, the elbow between the two cylindrical segments bearing the total-reflection surface.

8. A vehicle ceiling light, comprising:
at least one device for light-generating in a vehicle interior comprising:
a separating tube made of a material that is opaque to the radiation used and configured to be placed in an aperture forming an exit for illuminating light, and which is tubular along an axis orthogonal to the aperture and has a radial cross section that is "c" shaped, so as to form an axial window;
a bounding light guide, encircling the separating tube having:
an annular exit dioptric interface, and a base in the axial extension of the exit dioptric interface, axial extensions, which extend the base axially at least in part, comprising, at their end opposite the base, entrance dioptric interfaces, which are placed facing bounding light sources, a guide of illuminating light, which is located axially facing an illuminating light source and axially offset from the aperture, comprising:

an entrance dioptric interface, placed facing the illuminating light source, a total-reflection surface, from which light entering through the entrance dioptric interface is reflected at a preset angle of inclination to the normal to the entrance dioptric interface, an exit dioptric interface, through which the light reflected from the total-reflection surface is emitted in the direction of the aperture, wherein the illuminating beam is oriented toward a location of an occupant of the vehicle.

9. The vehicle ceiling light as claimed in claim 8, further comprising: a façade, most of the area of which is opaque and which comprises a transparent circular window located facing an end of the separating tube that is opposite to the illuminating light source, forming the aperture.

10. The vehicle ceiling light as claimed in claim 9, further comprising: an annular window facing the exit dioptric interface of the base of the bounding light guide.

11. The vehicle ceiling light as claimed in claim 10, wherein the façade comprises an opaque layer or coating over most of its area, and wherein the transparent circular window and annular windows have a transparency comprised between 10 and 50%.

12. The vehicle ceiling light as claimed in claim 9, wherein the façade comprises at least one touch surface, which, when contact with a part of the body of a user is detected, turns on or off the illuminating light source.

13. The vehicle ceiling light as claimed in claim 12, wherein the touch surface is placed level with the aperture.

14. The vehicle ceiling light as claimed in claim 8, wherein the at least one device comprises two devices, one device emitting an illuminating beam in the direction of the driver of the vehicle, the other device emitting an illuminating beam in the direction of a front passenger of the vehicle.

\* \* \* \* \*